FIG. 1

INVENTOR.
ROBERT H. PARK
BY Kenway, Jenney &
Hildreth
ATTORNEYS

United States Patent Office 3,515,893
Patented June 2, 1970

3,515,893
METHOD OF IMPROVING THE STABILITY OF
INTERCONNECTED POWER SYSTEMS
Robert H. Park, Dennis, Mass., assignor to Fast Load Control, Inc., a corporation of Massachusetts
Filed Feb. 7, 1966, Ser. No. 525,615
Int. Cl. H02j 3/06
U.S. Cl. 307—52          2 Claims

ABSTRACT OF THE DISCLOSURE

Control systems for changing the distribution of power flow within an interconnected power system, through the execution of changes in the driving power of prime movers, and changes in connected electrical loads, wherein initiation of control action is responsive to suddenly occurring events adapted to cause, or which could cause, system instability, and the power flow changes take place in such a way and with sufficient speed as to prevent or oppose development of instability.

My invention relates to means for rapidly controlling power flow within power transmission elements of large interconnected power systems with a view to favorably affecting the stability of such systems.

More particularly, my invention relates to means, as above, which represent an advance over the prior art, including my issued U.S. Pats. Nos. 3,051,842 and 3,234,397 the second of which has been reissued as Pat. No. Re. 26,571, having to do with employment of line fault initiated combined use of fast momentary and sustained prime mover driving power reduction and momentary application of braking loads in power exporting areas of systems, and also line fault initiated fast boosting or driving power and shedding of load in power receiving areas of systems, as a means of stability improvement and this patent is a continuation-in-part of those patents.

In relation to prior art concepts, it was already old in the art, prior to the filing of my issued patents, to employ generator trip off, tie line opening, momentary application of braking loads, and, fast momentary reduction of prime mover driving power, as measures for improving system stability in the event of a transmission line fault, and also to control such means in relation to both load fault severity and to conditions obtaining prior to the fault (2, 3, 4, 5, 6, 12).[1]

My first issued U.S. Pat. 3,051,842, dealt in part with line fault responsive procedures for electrically isolating a generator, generating station, or a generating segment or area of power system, from the balance of the system applying braking and fast prime mover driving power reduction during the period of isolation, as a way to reduce generator acceleration and thereafter reconnecting, to the balance of the system.

In another aspect, my first issued patent dealt with the use of fast prime mover driving power reduction and braking applied in a generating segment or area of a system on the occurrence of a fault on a line comprising only one path of two or more electrically parallel paths of power flow leading from the generating area to a power receiving area of a power system and with no generators or elements of the system other than the faulted line itself isolated.

An aspect of my first issued patent was that fast prime mover driving power reduction was optionally executed, not merely momentarily, as in the prior art, but also on a sustained basis.

Another aspect of that patent was that when isolation was employed, fast driving power reduction and momentary application of braking load were optionally used in combination, whereas, when isolation was not used, these measures were proposed for use only as alternative procedures.

A further aspect of that patent was the concept of modulation of line fault initiated prime mover driving power reduction responsive to transmitted load, through employment of a control system which altered its control characteristic in response to transmitted load up to the instant of fault, but that was uninfluenced by what happened during or after the fault.

My second U.S. Pat. No. 3,234,397, introduced the concept of employing line fault initiated momentary plus optionally sustained type prime mover driving power reduction apply in combination with dynamic braking within a generating segment or power exporting area of a power system in the multiple parallel path of power flow case in which generator or system element isolation would not be used, with a view to reducing generator acceleration within the generating segment and added two additional concepts, namely fault initiated at least momentary load shedding, optionally supplemented by fault initiated boosting of prime mover driving power both measures being executed in power receiving areas of power systems as a way of reducing deceleration of generators located in such areas and added the principle of response of prime mover driving power and connected load controls to the occurrence or non-occurrence or redevelopment of a line fault, when and if faulted line breakers were automatically reclosed.

Further, my second U.S. patent deals with the case wherein a generating station is tied to a power receiving system over parallel lines, and the power receiving system has a weak tie to a second power system, and it is an object of the fault initiated fast prime mover driving power and electrical load control system to not only prevent loss of synchronism of the generating station with the system that receives power from it directly, but to also avoid loss of synchronism of that system with the power system to which it is only weakly tied.

Thus, my two issued patents dealt with situations in which a fault on a line connecting two elements of a three element interconnection could cause loss of synchronism of any one element with the other two.

It was an aspect of both my two issued patents, and also a characteristic of prior art patent and literature references to provide means of avoiding development of instability of the generators of a generating station or generating segment or area of a power system when a fault occurred on one or more essentially radial transmission lines linking the generating station or generating segment of a system to a power receiving system, where the receiving system was view as essentially unitary, which is to say tending to behave dynamically as a single entity.

However, it was also an aspect of both of my issued patents to provide means of dealing with situations wherein a generating station or a power system or area of a system containing generating capacity is joined to a power system interconnection by lines which makes connection over disparate paths of power flow from the station, system or system element to dynamically independent components of the interconnection.

Thus, my issued patents show three power systems or segments or areas of a system, which contain generators and which are interconnected by three lines, and it is an aspect of both patents that control action initiated in response to a line fault is modulated as to extent and nature in response to the weighted sum of the power that is being transmitted prior to the fault over pairs of lines which represent disparate paths of inter or intra systems power flow.

[1] Numbers in parentheses refer to appended table of references.

Also, beginning in 1962, means not shown in my patents, or other patent literature, were described which afford a useful way to control fault initiated application of braking load and prime mover driving power, as also generation rejection, all with a view to prevention of system instability, which incorporate response to conditions obtaining subsequent to a disturbance (14, 18, 27).

Further, it has been proposed to employ rapid variations of the potential applied to grids of grid controlled A.C.-D.C. converters as means of rapidly changing power transfer to, from, or within interconnected power systems over high voltage direct current lines, as a way to counter tendencies to system instability when line faults occur on alternating current transmission lines of the interconnection (25).

Aside from what is described in my second patent, I know of only three prior approaches to what could be termed event, as against drop in frequency, initiated load shedding, as follows:

(a) load shedding carried out within a system that loses all connection with another system, and directed to avoiding a system separation (36).
(b) load shedding effected via radio signals responsive to the event of a generator trip off, and directed to avoiding a system separation (37).
(c) load shedding responsive to the event of loss of one but not all lines uniting an area of a system to the balance thereof (23).

These references, it may be noted, do not cite event initiated combined load shedding and prime mover driving power boosting.

Thus, there has been very substantial recognition of what I herein designate generally as "fast load control" possibilities.

Though there has been prior use of what I have termed fast load control, heretofore utilized or proposed fast load control systems including those shown in my two issued patents, have been directed to improving the stability of power systems, whether large or small, under circumstances wherein the objective was to entirely prevent loss of synchronism and sustained interruption of power flow between any system power generating and power using elements of a power system in the event of a fault.

In contrast, the present invention is directed to favorably affecting the stability of large interconnected power systems by employment of fast prime mover driving power and system connected electrical load control means which are activated in response to events such as trip off of an individual generator for any cause, the trip off of all the generators in a power station due to the pulling out of step of the station generation as a whole, opening of a system tie line resulting in overloading of parallel paths of power transfer, whether or not resulting from a line fault, loss of a radially connected load or a radial connection to a power source which had been feeding power to an interconnection or the termination or a sudden decrease or increase in power transfer over a D.C. line as a result of A.C.-D.C. converter control action, or other events, which cause or could cause the occurrence of sustained power flow interruptions involving either major changes in the amount of power transferred between two portions of an interconnected power system.

By way of illustration, the present invention provides a way to deal with sustained interruptions of power flow over a group of transmission lines comprising at least two but not all lines of a power transmission system which unite a portion of the interconnection to the balance thereof by at least three lines.

Also in this, my invention offers a means of favorably affecting system stability in the event of lack of success in maintenance of system stability on execution of a line fault clearance.

In this connection, it is an aspect of my invention to set forth a novel way of modulating employment of fast load control used in the above connections, is in response to predisturbance values of system power flows.

Again, an aspect of my invention relates to provision of improved means of accomplishing prime mover driving power control and load shedding operations.

Thus, with reference to prime mover driving power control, most power system steam turbines which employ fossil fired steam generators are of the reheat type, and in relation to this point, are subject to limitations as to feasible speed of accomplishment of driving power changes, and it is a part of this invention to show how these limitations can be in considerable degree overcome by modified turbine design.

In addition, the present invention introduces the concept of fast, system disturbance initiated, momentary load shedding, together with preselected load type, short duration, sustained load shedding incorporating provision for progressive, time delayed, automatic reconnection, wherein controls, located in customers premises, and acting in response to power supply interruption applied to selected load areas and maintained for a controlled period which may comprise only a fraction of a second, or responsive to other signals, operate to deenergize selected load elements on a sustained basis, and thereafter automatically cause progressive reenergization over selected time periods, which can be varied as between customers to afford time diversity, and also adjusted to allow time for activation of system spinning reserve or quick start-up non-spinning reserve and/or rearrangement of system loads via changes in load-frequency control system settings.

To aid in making clear certain aspects of my invention, it may be desirable to bring out the point that, whereas employment of fast control of steam turbine driving power has been made use of by the power industry, over the years, it appears to have been applied only to non reheat turbine generators, and also always employed in only three connections, i.e.

(a) to neutralize cyclic tie line power swings (8, 29, 32)
(b) to rapidly boost the power generation of a power receiving system in the event of development of a condition of reduced system frequency.
(c) to minimize power swings over tie lines which unite power systems to steel rolling mills where the mill generates power with use of a non reheat-type steam turbine (29).

Under modern conditions small systems commonly are joined to form larger systems, large systems are joined with other systems to form pools, and pools are joined together to form superpools or large interconnections, with the effect that presently, for example in the U.S. east of the Rockies, about 130,000 megawatts of generating capacity are usually tied together (31), from which it follows that until synchronism is lost within the system, even the tripping off of a 1,000 megawatt generator will have little effect on frequency.

Thus, under conditions which we will designate as conditions applying to an "extended interconnection," the effect is that ordinary system disturbances do not alter frequency, appreciably which means that in the event of a system disturbance, speed governors play almost no part until they are eventually influenced by slowly acting, conventional load-frequency control equipment (31).

Accordingly, in an extended interconnection, any equipment for boosting turbine driving power that operates rapidly only in response to a system frequency drop will have no opportunity to function rapidly until and unless a portion of the system either pulls out of step, or is disconnected by tie line circuit breaker action.

Thus, under extended interconnection conditions currently prevailing in the U.S., if a generator is tripped off the line in, say, the Consolidated Edison system, when that system is tied to its neighbors, and until such time as load-frequency controls have come into effect, every generator in the U.S. east of the Rockies that is not already fully loaded will try to contribute its proportional share to make up for the loss, which implies that for all practical purposes a surge or "inrush" of power nearly equal to the output of the operator that was tripped will flow into Consolidated Edison via its ties to neighbors (24).

Also, in the case of certain systems wherein presently non reheat turbine standby generators are normally run at low output, subject to automatic fast driving power boost in the event of a frequency drop, the effect is or will tend to become that the turbines in question will fail to boost output in the event of a sudden loss of system generating capacity, except only in the event of a disturbance which causes system isolation, since frequency drop due to even a large loss in capacity will be small, and therefore difficult to distinguish from frequency changes that occur at times when fast output boosting of standby equipment would not be desirable.

In contrast, the fast load control features of the present invention provide means to rapidly activate system spinning reserve within a large interconnection and the simultaneously shed load rapidly, as also to apply electrical braking load and fast prime mover driving power reduction at other points of the system, optionally in combination with fast changes in power flow over D.C. transmission systems executed in response to A.C.-D.C. converter control signals which may be programmed to come into effect independently of frequency.

In respect to the load shedding aspect of the present invention, it may be noted that whereas the position of utilities has tended to be that load shedding should not be planned except by contract arrangement. However, in view of difficulties of the Nov. 9, 1965, U.S. northeast blackout, may eventually be judged to be in the public interest that in the future power companies plan on more general brief automatic load shedding in the event of stringent contingencies.

In this connection, preselected load type, short duration load shedding offers a way to alleviate objections to load shedding that have hitherto prevailed, while also it will be easily recognized that such provision for load shedding would operate to afford advantages relative to ease and feasible speed of restoration of system voltage following an occasion of total voltage collapse.

With respect to the aspect of the present invention having to do with ability to rapidly boost output of reheat turbines, it may be noted that such capability can reduce need for load shedding, and also provides a way to allow compensating for the appreciable delay in driving power build up in response to governor control point biasing that normally applies to other than low head water driven prime movers and to gas and non reheat type steam turbines.

It is an aspect of my invention that it describes new ways to use known fast load control devices and combinations of such devices such as described in my issued U.S. Pats. Nos. 3,051,842, 3,234,397, and Re. 26,571 as aids to preservation of system stability whereby to enhance the utility of such devices.

It is an object of my invention to provide a way of making effective use of any appropriate type of fast load control procedure, as an aid to preservation of the stability of an extended power system interconnection on the occasion of an event which either causes isolation of a power supplying or power accepting element of the interconnection or involves the interruption of power flow over at least two lines of a power transmission system which unites a portion of the interconnection to the balance thereof by at least three lines.

Another aspect of my invention is to provide a useful way of modulating employment of fast load control in extended power system interconnections in the event of a disturbance comprising a system power flow interruption wherein modulation is responsive to predisturbance values of system power flows.

Also, a further, related object of my invention is to provide control means, independent of system frequency, for initiating power system prime mover driving power boosting and load shedding in the event of development of a local power supply deficiency within a power system.

Another related object of my invention is to provide a means of fast boosting of driving power of prime movers, and fast load shedding which is adapted for use in power systems which represent components of an extended system interconnection.

Another object of my invention is to provide ways for improving the capabilities of power system reheat type steam turbines to execute rapid boosting of prime mover driving power.

Another object of my invention is to provide within an extended power system interconnection a system of momentary load shedding together with sustained, preselected load type shedding of load within customers' premises, coupled with provision to automatically reenergize progressively over a controlled time period.

Another object of the present invention is to provide an improved way by means of which both steam turbine and waterwheel driven generators may be utilized as source of power system spinning reserve generation.

Another object of my invention is to provide improved means of fast load control including but not limited to employment of fast prime mover driving power control and/or fast momentary and/or preselected load type, short duration load shedding which are adapted to usefully supplement methods that have heretofore been proposed and/or used for improving the ability of such systems to resist development of system instability.

The subject matter which is regarded as the invention is particularly pointed out and claimed in the concluding portion of the specification. The invention, however, both as to organization and method of practice, together with further objects and advantages thereof, may best be understood by reference to the following description taken in connection with the accompanying drawings in which:

Figure 1:
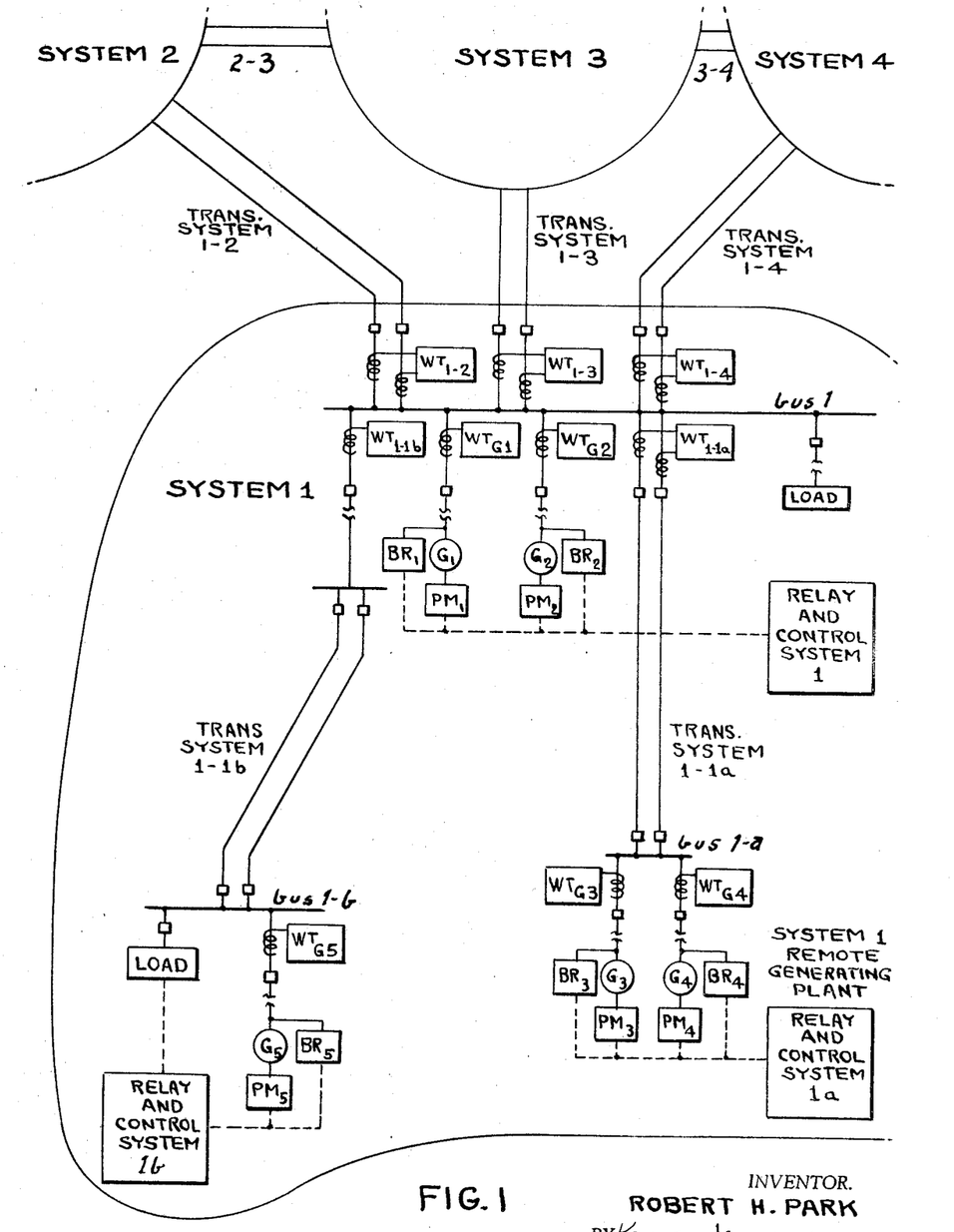
FIG. 1 is a diagrammatic representation of an interconnection of four power systems which is adapted to be operated with the present information.

Referring now to FIG. 1, system 1 is shown connected to each of systems 2, 3 and 4 by power transmission systems 1-2, 1-3, and 1-4, which, though shown as alternating current dual lines, could also be single lines, or a group of more than two lines, or could comprise or include a direct current system tie or ties, while also where some lines are shown of equal voltage, and some of different voltage, all could be of the same, or all of different voltages.

Systems 2, 3 and 4 are intended to represent elements of a large power pool or extended interconnection of systems, and are shown connected to each other by transmission systems 2-3 and 3-4 and also may be further interconnected, as through other lines of the interconnection of systems in which they are participants, yet may typically be dynamically relatively independent, or "integral," in that generator rotors of each system can be expected to swing relatively in the event of a fault on either of transmission systems 1-2, 1-3 or 1-4.

Power is generated within system 1 by generators $G_1$ to $G_5$ driven by prime movers $PM_1$ to $PM_5$.

Line and generator circuit breakers shown conventionally are to be understood as controlled by relay systems 1, 1a and 1b, which are to be understood as arranged to be responsive to system currents and voltages and to also be controlled in response to manual tripping, as also to the operation of or control by a number of automatic breaker trip initiation means that are commonly provided, with a view to preventing catastrophic type boiler, turbine, and generator failures that could otherwise occur in the event of operating difficulties due to failure of equipment components (34, 35).

Watt transducers $(WT)_{G1}$, $(WT)_{G2}$, etc. are shown connected to current transformers, and also receive voltage inputs from voltage sources not shown, in such manner as to be responsive to generator power outputs, and total power flow over transmission systems 1-1a, 1-2, 1-3 and 1-4.

Also it is to be understood that relay system and watt transducer outputs are supplied as inputs to control systems 1, 1a and 1b, which incorporate various fast system load control means.

Elements $BR_1$ to $BR_5$ comprise generator braking resistor installations.

Dotted lines show paths of control.

It will be recognized by those skilled in the art that relay systems 1, 1a and 1b will normally incorporate a selection among various conventionally used (19) line fault, line overload, and out of step, and generator, transformer, and bus relays.

It will also be recognized that the operation of such relays can be used variously, alone or in conjunction with one or more already known types of power responsive or other controls (3, 4, 12, 14, 16, 18, 27) to program application of electrical braking load, fast boosting and bucking of prime mover driving power, and fast load shedding.

Thus, in particular, my issued and pending patents teach measures which can be employed to prevent loss of synchronism of generators $G_3$ and $G_4$ with the balance of the system in the event of a fault on a line of transmission system 1-1a or equally of generator $G_5$ in the event of a fault on transmission systems 1-1b, or of system 1 with the balance of the interconnection in the event of faults on transmission systems 1-2, 1-3 or 1-4, while also the same teachings have application in case of employment of D.C. transmission systems.

However, the concepts of the present invention go further in that, for example, they are directed to make provision to favorably influence system stability when, subsequent to a fault on a line of transmission system 1-1a, or in response to any other initiating event, as for example the pull out of generators $G_3$ and $G_4$, followed by out of step relaying, a sustained and entire interruption of power flow over transmission system 1-1a occurs, a fast load control system responsive to the initiating event is activated and caused to operate in a manner adapted to minimize the power inrush through transmission systems 1-2, 1-3 and 1-4 which tends to develop with loss of the power output of generators $G_3$ and $G_4$.

Also, the same concepts apply in relation to events which lead to sustained cut off of, or in the case of D.C. lines, to any major sustained reduction of power flow, over any of transmission systems 1-1a, 1-1b, 1-2, 1-3 or 1-4, or the sustained termination of power supply by any system 1 generator as in relation to the tripping of a generator output circuit breaker, or otherwise.

In general, control effects needed will depend on various factors. Thus, the opening of the output breaker of a 600 mw. system 1 generator might well represent a less adverse event than the interruption of transmission system 1-3 power flow under a load of 600 mw.

For example, if system 1 were receiving 600 mw. over transmission system 1-2 and say 150 mw. over each of systems 1-3 and 1-4, which, in this instance, were one-half the voltage of transmission system 1-2, in the absence of fast load control the effect of interruption of power flow over transmission system 1-2 would be that the power supplied over transmission systems 1-3 and 1-4 would tend to increase to a total of 900 mw. corresponding to a 2 to 1 increase in load or to 3 times the original value, which might be much more than enough to cause system 1 to pull out of step.

In contrast, in the case in question, loss of 600 m.w. of system 1 generating capacity would tend to boost total power flow over transmission systems 1-2, 1-3 and 1-4 from 900 to 1500 mw. which comprises an increase in load to 5/3 of the original value. Hence the amount of generator prime mover boosting and load shedding if any needed to preserve stability would differ markedly.

Also if a system 1 generator breaker were tripped open at no, or only light, generator load, or if power flow over any of transmission systems 1-1a, 1-1b, 1-2, 1-3, or 1-4 were interrupted, for any reason, at only light load, load shedding and/or driving power boosting would not be needed, but rather would be undesirable.

Again, tripping off of a generator or interruption of power flow over transmission systems 1-1a or 1-1b under heavy load could be unimportant if it occurred at a condition of light load on transmission systems 1-2, 1-3, and 1-4.

Accordingly, a system disturbance initiated, power responsive control is needed which controls differently in relation to the nature of the event or events, as also system conditions, with which the disturbance is associated, thus as to whether in relation to interruption of power flow over lines of transmission systems 1-1a, 1-1b, 1-2, 1-3, or 1-4, or to the opening of output circuits of generators $G_1$, $G_2$, $G_3$, $G_4$, or $G_5$, as also in relation to power limits and predisturbance power flows over transmission systems 1-2, 1-3, and 1-4.

In this connection, the effect of a system disturbance wil sometimes relates to deficiency of a system prime mover driving power, therefore tending to retard space phase of prime movers, and consequently call for fast prime mover driving power boosting and/or system load shedding, and, where D.C. tie lines are involved, for boosting of power flow toward or reducing power flow away from the system, while in other cases there will be an excess of prime mover driving power, therefore calling for fast prime mover driving power reduction, and/or electrical braking load application and generation rejection, and also boosting of power flow away from or reduction of power flow toward the system over D.C. lines.

Now, in this connection, if $P_1$=system 1 export power=power input to system 1 bus 1 from all sources other than such of transmission systems 1-2, 1-3 and 1-4 as one of the A.C. type, less the system 1 bus 1 load and if $P_2$, $P_3$ and $P_4$=input to system 1 bus 1 over such of transmission systems 1-2, 1-3 and 1-4 repectively, as are of the A.C. type, it will follow that under all conditions $$P_1 + P_2 + P_3 + P_4 = 0 \tag{1}$$

so that if $P_1$ were suddenly altered by an amount $\Delta P_1$, it would follow that such change would be matched by sudden changes in $P_2$, $P_3$ and $P_4$, $\Delta P_2$, $\Delta P_3$ and $\Delta P_4$, which would necessarily conform to the relation $$\Delta P + {}_2\Delta P_3 + \Delta P_4 = -\Delta P_1 \tag{2}$$

or say there would be $$\Delta P_{234} = \Delta P_2 + \Delta P_3 + \Delta P_4 = -\Delta P_1 \tag{3}$$

At this point consider the case wherein the system is operating under steady load conditions, when suddenly a portion of system 1 generated power is lost due to the tripping off of a generator, or in the event that input of power to system 1 bus over transmission systems 1-1a or 1–1b is suddenly interrupted, or in the case of a D.C. line, perhaps merely reduced.

Evidently, in such case, in an extended interconnection wherein appreciable frequency changes cannot occur, and with maintenance of synchronism, and subsequent to a period within which system generator rotors decelerate or accelerate, to take new relative positions, and also load is shed and prime mover driving power boosted, and/or D.C. line power flow toward bus 1 increased, it will tend to be true that $$\Delta P_{234} = \Delta P_1 = \Delta P_g - P_{sb} \quad (4)$$

where:

$\Delta P_g$ = amount of system power input cut-off $$P_{sb} = L_s + P_b \quad (5)$$

$L_s$ = amount of load shed in system 1
$P_b$ = a measure of benefit equivalent to load shedding that can be derived from as fast as feasible system 1 prime mover driving power boost plus effects due to fast regulation of power supply over D.C. lines if any although Equation 4 will not follow entirely, as there can be a drop in system voltage which can act to somewhat decrease system load.

However, in any case, the relationship of Equation 4 comprises a good general guide for use in relation to programming fast load shedding and prime mover driving power boosting.

Also, in relation to such of transmission systems 1–2, 1–3 and 1–4 as are of A.C. type, there will be a maximum limit of power flow toward system 1 bus that can be transmitted on a sustained load basis over the systems in question say $P_{234m}$ without development of instability, while also, as see FIG. 12 of reference (1), the maximum surge power $\Delta P$ that can be transmitted in a given direction over a single line initially carrying a load $P_o$ in the same direction, and where the power limit is $P_m$, is $$\Delta P = .73(P_m - P_o) \quad (6)$$

According, and if $P_{234o}$ is assumed positive, which is the case of greatest practical importance, avoidance of loss of synchronism in the event of a disturbance due to loss of a system 1 generator, or to interruption of power flow toward system 1 bus over transmission systems 1–1a or 1–1b, would tend to require $$\Delta P_g - P_{sb} < K_{234}(P_{234m} - P_{234o}) \quad (7)$$

where:

$P_{234o}$ = value of $P_{234} = P2 + P3 + P4$ prior to the disturbance and $K_{234}$ is a numerical factor that can be determined by system studies, test, or experience, and would include consideration of steady state as well as momentary power limit, but which can have a value approximating .73.

Accordingly, to avoid loss of synchronism, it is necessary that $$P_{sb} > \Delta P_g - K_{234}(P_{234m} - P_{234o}) \quad (8)$$

which can be taken to imply that to avoid hazard of instability $P_{sb}$ should be so adjusted that $$P_{sb} = \Delta P_g - K_{234}(P_{234m} - P_{234o}) + kP_{234m} \quad (9)$$

where $k$ is suitably chosen as say in the range of 0.1 to 0.2.

Figure 3:
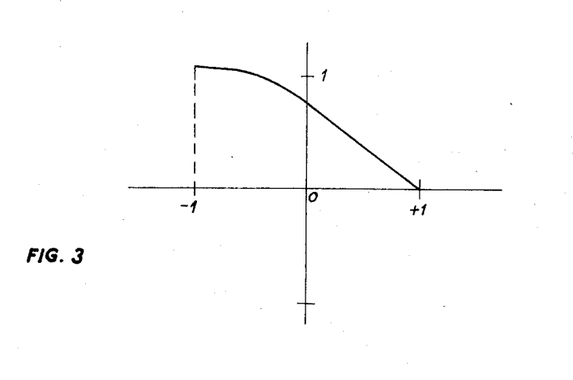
FIG. 3 comprises a curve showing a functional relationship.

On the other hand, in the general case where $P_{234o}$ is either positive or negative, it is necessary to take account of the fact that where $P_{234o}$ can be negative, Equation 6 has to be written in the form $$\Delta P = P_m f(P_o/P_m) \quad (10)$$

where $f(x)$ is a function such that, in the range $x=0$ to $x=1$ $$f(x) = .73(1-x) \quad (11)$$

but which bends over for negative values of $x$ generally as shown in FIG. 3 and has the value $f(x) = 1.0$ at $x = -1$.

Accordingly, it follows that an appropriate relation for $P_{sb}$ in the general case of $P_{234o}$ either positive or negative should be sought in the form $$\Delta P_{sb} = \Delta P_g - P_{234m}f_{234}(P_{234o}/P_{234m}) + kP_{234m} \quad (12)$$

where $f_{234}(P_{234o}/P_{234m})$ can be found by means of calculation or by test or experience, but will tend to resemble $f(x)$ as shown in FIG. 3.

If now power flow over transmission system 1–2 were to be interrupted suddenly, and assuming that at least one of transmission systems 1–3 and 1–4 is of the A.C. type, it would be equally in order to expect a relationship to hold of the form $$P_{sb} = P_{20} - P_{34m}f(P_{34o}/P_{34m}) + kP_{34m} \quad (13)$$

and correspondingly in the event of interruption of power flow over lines 1–3 and 1–4.

Now, with respect to interruptions to power flow over transmission systems 1–1a, 1–1b, 1–2, 1–3, and 1–4, it is recognized that in the event of line faults, and where these transmission systems incorporate more than one line, it will normally result that a fault develops on only one line, and that line alone is isolated, and also usually isolated only momentarily except when the fault is of the permanent type, while ways of maintaining system stability in the event of this type of system disturbance have been extensively studied and provided for.

Accordingly, the present invention has been directed to dealing with those situations which have not heretofore been effectively dealt with, wherein as a result of any event, power flow over all lines of the transmission system is interrupted, as can occur as a result of out of step type (19, 33) or other (27) relay action, whether or not for good cause.

Accordingly, with this concept there is a need for a system that will develop control signal voltages generally as given by Equations 12 and 13 for use in modulating the operation of load shedding and prime mover driving power boosting means.

Figure 2:
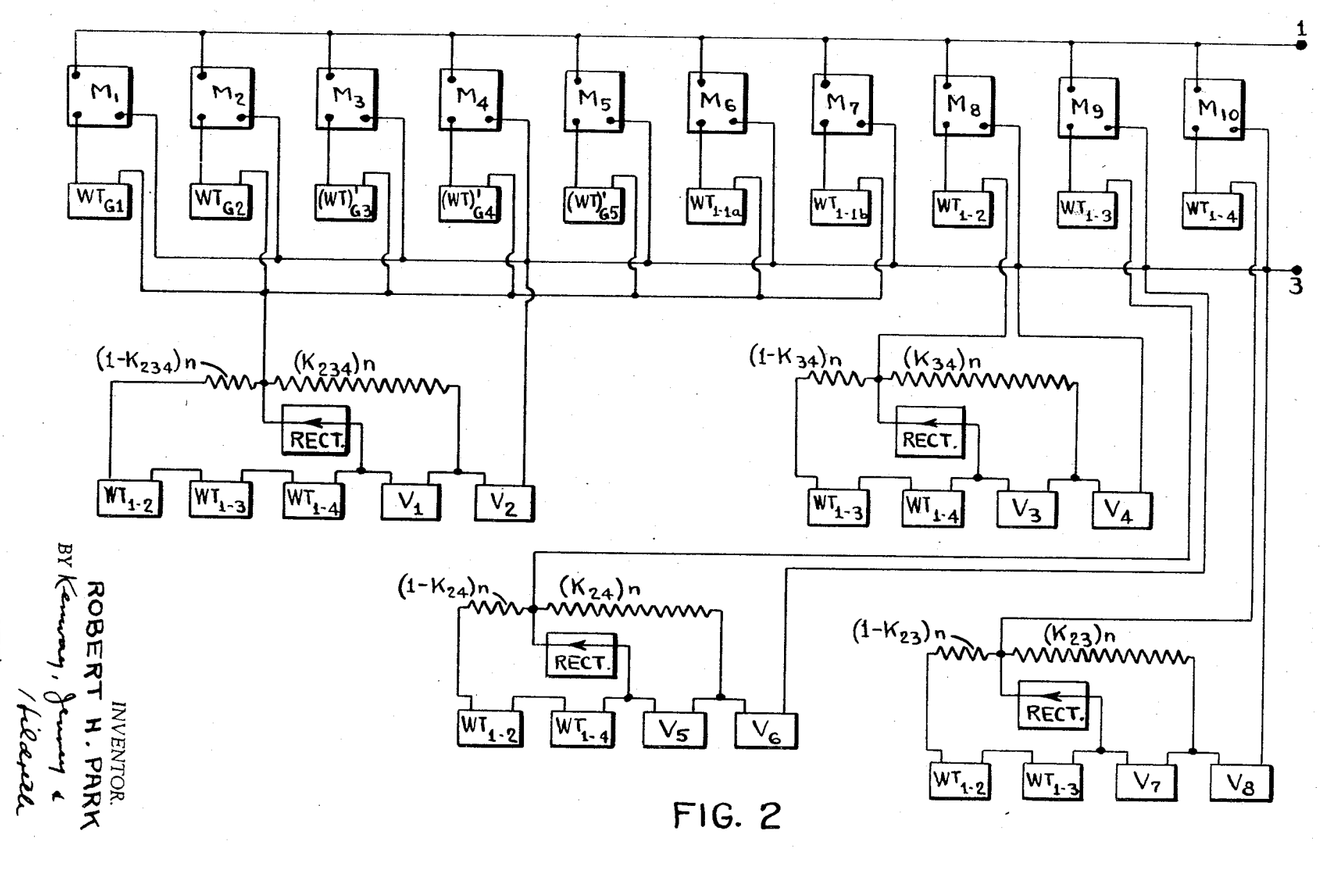
FIG. 2 is a diagrammatic representation of a control system adapted to favorably regulate fast load control means.

FIG. 2 comprises such a system.

Thus, referring to FIG. 2, memory units 1 through 10 are connected to receive as a component of their voltage inputs the outputs of all power transducers located in the system 1 high voltage bus area, and also telemetering transducer outputs of generators $G_3$, $G_4$, and $G_5$ shown under designations $(WT)'_{G3}$, $(WT)'_{G4}$, and $(WT)'_{G5}$.

In addition, memory units $M_1$ through $M_7$ receive supplementary voltage inputs comprising D.C. voltage source $V_1$ which is made suitably proportional to $-P_{234m}$ plus the sum of the outputs of transmission systems 1–2 and 1–3 and 1–4 power transducers, except reduced in the ratio $K_{234}$ to 1, by means of a dropping resistor having branches $(K_{234})r$ and $(1-K_{234})r$ and modified by the effect of rectifier RECT, plus the voltage of D.C. voltage source $V_2$ which is made proportional to $+kP_{234m}$.

Figure 4:
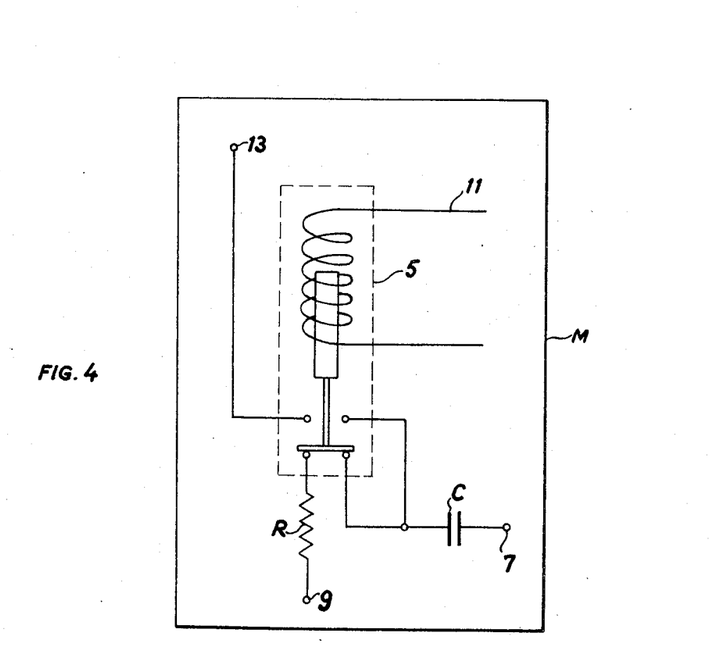
FIG. 4 comprises a memory unit.

FIG. 4 shows that memory unit M consists of a quick acting relay 5 wherein normally closed contacts make a path to allow charging a condenser C through a resistor R by supply of voltage to terminals 7 and 9, while when coil 11 of the relay is energized, the circuit through R is interrupted and the terminal of the condenser adjacent to R is connected to terminal 13 which in FIG. 2 is connected to the lead to terminal 1, while terminal 7 is connected to the lead to terminal 3.

Returning now to FIG. 2, proper operation requires the selective activation of memory devices by sustained energization of coil 11 of the appropriate device, as per the schedule below:

Power interruption: | Memory unit
--- | ---
Generator $G_1$ output | 1
Generator $G_2$ output | 2
Transmission system 1–1a (all lines) | 3
Transmission system 1–1b (all lines) | 4
Generator $G_3$ output | 5
Generator $G_4$ output | 6
Generator $G_5$ output | 7
Transmission system 1–2 (all lines) | 8
Transmission system 1–3 (all lines) | 9
Transmission system 1–4 (all lines) | 10

More than one method of effecting desired selective energization of memory units can be used. For example, in the case of generator circuits it would normally be desirable to energize memory unit relays from a suitable power source via a normally open latching type relay which closes and latches-in when the generator output circuit breaker trip circuit is energized.

However, at the sacrifice of a loss of speed of control system response, it would also be possible to energize through a latch-in type relay arranged to be energized by generator breaker auxiliary contacts which close when the breaker opens.

Again, it would be possible to energize in response to the operation of a control device which becomes operative in anticipation of a need, or only a possible need, to trip the generator breaker, and as part of a cycle in which fast load control is applied and the generator breaker tripped, if at all, only after a delay. For example, a power swing type relay (27) could be employed as a means of anticipating the possibility of development of generator pull out.

Also, generally similar considerations apply to energization of relays of transmission system memory units except that provision needs to be made so that energization of the relay of the appropriate memory unit is only accomplished when entire power flow over all lines of a radial transmission system such as 1–1a, or 1–1b, is interrupted, and when entire power flow over all lines of selected groups of all lines uniting system 1 to the balance of the interconnection is interrupted.

In FIGS. 1 and 2 the group of all lines uniting system 1 with the interconnections that were selected comprised

| | Transmission system | Description |
| --- | --- | --- |
| Group: | | |
| 1 | 1–2 | All lines uniting systems 1 and 2. |
| 2 | 1–3 | All lines uniting systems 1 and 2. |
| 3 | 1–4 | All lines uniting systems 1 and 4. |

However, other groupings could have been used.

For and merely by way of example, if group 1 above comprised two parallel or double circuit lines uniting system 1 and system 2 over one path, and two other parallel or double circuit lines doing so over a different path, it could be considered desirable to add sub groups to the above table, as below

| | Transmission system | Description |
| --- | --- | --- |
| Group: | | |
| 1a | 1–2 | Two lines following path a. |
| 1b | 1–2 | Two lines following path b. | with the thought in mind that system disturbance initiating events, such as a windstorm, lightning, crash of an airplane, etc., could act to cause a permanent fault on both lines or circuits of group 1a, while group 1b could yet remain intact, and vice versa.

Yet, at the same time, if system 2 pulled out of step with the interconnection, it would still be necessary to open all lines of transmission system 1, comprising all group 1 lines of the total transmission system comprising the combination of transmission systems 1–2, 1–3, and 1–4, which operate to unite system 1 to the interconnection.

Accordingly, if control in response to power flow over line groups 1a and 1b were to be made a part of the fast load control system, it would yet be desirable to retain power flow over all group 1 lines as a FIG. 2 signal generation control means, and to add two more memory units 11 and 12 which would be arranged to receive appropriate watt transducer inputs.

As regards details of how to energize memory units, where response is to be had in relation to opening of all of a selected group of line breakers, for example all the breakers of each of transmission systems 1–1a, 1–1b, 1–2, 1–3, or 1–4, a suitable procedure would be to provide each line breaker with a latch-in relay which would close its contacts on a sustained basis when the breaker trip coil was energized, and to connect the contact circuits of the relays corresponding to each group in series.

However, where a group, such as group 1, has sub groups, such as sub groups 1a and 1b, it would also be necessary to provide so that when all lines of group 1 were tripped, a relay would be energized which opened the circuit to coils 11 of the sub group memory units, and only acted to energize the group 1 memory unit after a delay sufficient to allow the sub group memory unit relays to drop back to their non-energized positions, or alternately some equivalent system, as with use of rectifiers, whereby to avoid discharging the condenser of group 1 memory unit into a sub group memory unit condenser.

Again, it would be possible to energize transmission system memory units other than in response to energization of breaker trip circuits, and, in particular, provision to activate fast load control in response to some type of relay, or other information source, that would give advance notice of a probability of a system, as say system 1 or 2, pulling out of step with the interconnection, would often be desirable.

Accordingly, it is a part of my invention that the option may be exercised of providing for activation of memory units other than in response to line breaker tripping, and, accordingly, with a view to rapidly initiating and controlling type and amount of fast load control, by means which respond to an event which could or might be expected to cause a power interruption. Thus, to be specific, memory units could be activated in advance of energization of line breaker trip coils by use of power swing relays (2, 3, 4, 27), voltage dip relays (3, 4) acceleration detection relays (6), generator momentary speed responsive control (18), generator vs. system displacement angle units (14), and certainly other types of relays or controls, as also in response to a purely manually applied signal.

At this point it is proposed to return to consideration of the special case of interruption of generator power output in response to an output circuit breaker trip signal, and to the way in which the circuits of FIGS. 4 and 2 cooperate.

Thus, evidently, if resistor R is large relative to resistor r, as is to be understood has been provided, and if generator 1 receives an output breaker trip signal during an otherwise undisturbed system condition, and if memory unit $M_1$ relay 5 acts faster than the operation of power flow interruption, which would also be provided for, memory unit $M_1$ will memorize and develop between signal generator output terminals 1 and 3 a voltage proportional to $$P_{sb} = P_{G1} - K_{234}(P_{234m} - P_{234o}) + kP_{234m} \quad (14)$$

up to the point at which $K_{234}(P_{234m} - P_{234o}) = P_{234m}$ which occurs when $P_{234o} = -(1 - K_{234})P_{234m}$, while in view of rectifier RECT, for more negative values of $P_{234o}$ the voltage will be simply $$P_{sb} = P_{G1} - (K_{234} - k)P_{234m} \quad (15)$$

Relations (14) and (15) together provide a rough approximation to Equation 12, and are on the safe side.

Also, similar results will apply in the event of tripping off of generators $G_2$ to $G_5$ and also with interruption of power flow over transmission systems $1-1a$ and $1-1b$.

Also, by further reference to FIG. 2, it will be clear that sudden interruption of power flow over transmission systems $1-2$ from an initial steady load condition will produce values of $P_{sb}$ corresponding to a modified form of Equation 13

$$P_{sb} = P_{2o} - K_{34}(P_{34m} - P_{34o}) + kP_{34m} \quad (16)$$

up to the points respectively that $K_{34}(P_{34m} - P_{34o}) = P_{34m}$ and beyond this point to a value of $P_{sb}$ $$P_{sb} = P_{2o} - (K_{34} - k)P_{34m} \quad (17)$$

Also, similar results, but with an appropriate change of notation, would apply to interruption of power flow over transmission systems $1-3$ and $1-4$.

Again if, for example, transmission system $1-2$ represented a D.C. line, Equations 14 and 15 would need to be modified by replacing $K_{234}$, $P_{234m}$, and $P_{234o}$ by $K_{34}$, $P_{34m}$, and $P_{34o}$, while Equations 16 and 17 would still hold, except that if power flow over the D.C. line toward bus 1 were merely reduced by an amount $\Delta P_2$, instead of wholly cut off, $\Delta P_2$ would replace $P_{2o}$ in Equations 16 and 17.

To obtain desirable performance in respect to signal generation, account has to be taken of the fact that if generator breaker tripping or line fault interruption occurred only subsequent to a line fault followed by line fault clearing with reclosing, and perhaps with use of fast load control including application of braking resistors, fast prime mover driving power control, and load shedding, the transducer output that acted to determine $P_{sb}$ would be subject to variations due to dynamic phenomena related to generator rotor oscillations, and by virtue of this fact would, in general, fail to operate to determine average value of power inrush over transmission systems $1-2$, $1-3$, and $1-4$, and therefore it could be desirable that R and C be so chosen that the quantity RC representing the condenser charge-discharge time constant was large enough to at least partially mask such effects.

In practice, best value of RC could be determined by suitable system studies carried out in application to situations or in relation to classes of cases, for example as between what would best apply in relation to opening of generator output circuits, and what to transmission system power flow interruptions, and, especially in relation to the case of transmission systems the matter of natural period of dynamically integral system elements, united by the system, and adapted to be set in relative oscillation, as by fault clearance programs that might ultimately result in the opening of the breakers of all transmission system circuits.

In the light of these considerations it would appear preliminarily that results of studies might be expected to show that suitable values of RC would lie generally in the range ½ to 10 seconds.

It will be noted that it has been necessary in what went before to make a distinction between transmission systems such as systems $1-2$, $1-3$ and $1-4$ which tie system 1 to the interconnection, and transmission systems such as systems $1-1a$ and $1-1b$ that do not.

This distinction would apply and hold true independently of the number of transmission systems involved of each type.

In the event of connection of system 1 to the interconnection over N transmission systems, the interruption of power flow over any one system would be handled by the same type of circuit as shown in FIG. 2 but with appropriately modified parameter values as also designations. Thus, as to designation, the power limit designations applying either to loss of a generator in or interruption of power flow over a radial transmission system in system 1 could be written without ambiguity simply as K, P, and $P_m$, while coefficient K and power and power limit applying in the event of interruption of a group, say group $g_1$, of lines connecting a portion of a system interconnection to the balance of the interconnection could be written without ambiguity as $P_{g1}$, $K_{g1}$, say $P_{m(g1)}$ and $P_{(g1)}$ respectively.

Thus, in the general case the signals would be, for isolation of power supply of receiving system element, as per Equations 14 and 15, except replacing $K_{234}$ by K and $P_{234m}$ and $P_{234o}$ by $P_m$ and $P_o$, and for interruption of power flow over a group of lines $g_1$ uniting a portion of an interconnection to the balance of the interconnection, as per Equations 16 and 17 except replacing $K_{34}$ by $K_{g1}$ and $P_{34m}$ and $P_{34o}$ by $P_{(g1)m}$ and $P_{(g1)o}$.

It is recognized that more advanced means of deriving a signal voltage having a magnitude indicative of need to program desirable extent of fast load control activity could be devised, and also that further study, or experience, could and probably will reveal the desirability of taking explicitly into account, dynamic phenomena such as can arise prior to full interruption of power flow over a transmission system, and especially dynamic conditions that can develop during lengthy fault periods and processes of going out of step.

While more versatile means of control can be devised, they evidently could be dealt with as in the nature of adjunct improvements to the system herein shown which could be brought into effect in the form of supplementary voltages added to the memory unit inputs and outputs of the FIG. 2 signal generator.

With a quantitative signal made available, by whatever means, there remains a need for a control scheme which will react suitably. Such a scheme is shown in FIG. 5.

Figure 5:
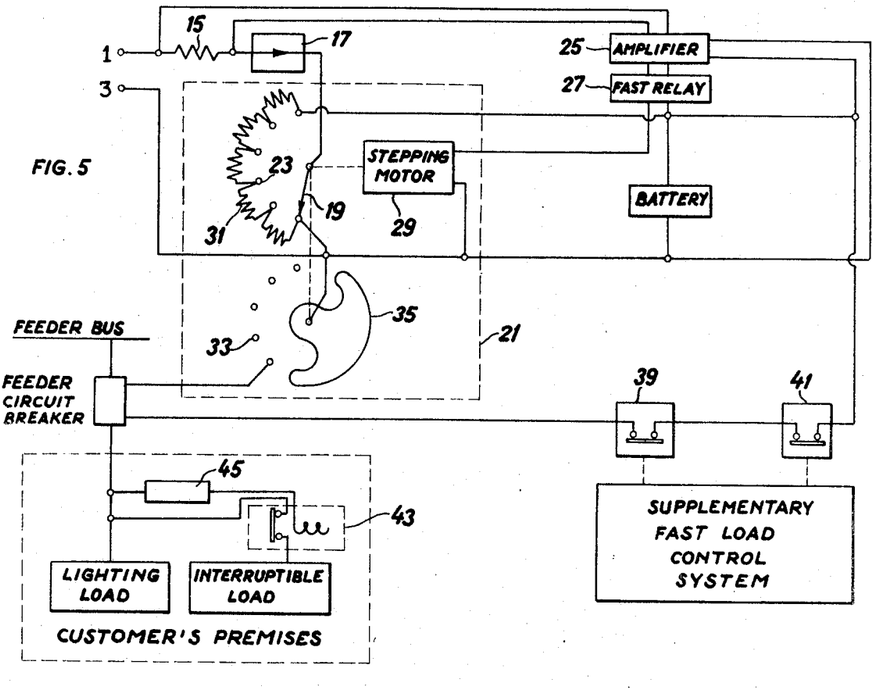
FIG. 5 comprises a load shedding and load shedding control system.

Thus, referring to FIG. 5, voltage appearing across terminals 1 and 3 of the signal generator of FIG. 2 is shown applied to a circuit comprising resistor 15, rectifier 17, and the axle end of wiper arm 19 of fast operating stepping switch 21, and from the contact end of the wiper arm to any one of a first bank of stationary contacts 23, and thence back to terminal 3. Amplifier 25 actuates fast relay 27 in response to voltage across resistor 15, while relay 27 in turn energizes stepping motor 29.

Resistor 31, which is preferably chosen larger than resistor 15, bridges across stationary contacts 23, with the result that appearance of more than a minimum signal voltage across terminals 1 and 3 will cause the stepper to step to a position generally proportional to the signal.

Stepper switch 21 is provided with a second bank of stationary contacts 33 which operate in conjunction with a progressive shorting sector wiper 35 to apply battery voltage progressively to contacts 33, each or at least some of which, as here illustrated in relation to the first of contacts 33 only is connected so as to control the opening of at least one system load feeder circuit breaker.

Automatic feeder breaker reclosing is an aspect of the invention. The process of automatic reclosing may be inherent in the breaker on the basis of a preset but not necessarily uniform reclosing time for each breaker, or may be made such that reclosing occurs only when the breaker trip signal is removed with control of instant of removal, as by the action of one or more time delay circuit opening relays, such as relays 39 and 41, which also could be selectively energized from any of contacts 33, or otherwise, operated selectively by supplementary fast load control means not herein detailed, and which could also be made to operate in response to type of system disturbance, as for instance whether or not involving interruption of power flow over transmission systems $1-2$ or $1-3$, or in response to presence or absence of dynamic phenomena occurring in advance of activation of memory units.

As also shown in FIG. 5, means may be provided in customers' premises so that lighting and/or other load that would be advantageously kept as fully energized as feasible during load shedding, is reenergized as soon as the feeder breaker recloses, whereas other load, such as, in the case of residences, water heating, electric ranges, refrigerators, oil burners, home heat, etc., is temporarily disconnected as for example by the opening of contactor 43 with reclosing determined by fast opening time delay reclosing relay 45.

Evidently, customers' load may be subdivided into portions some of which are reenergized after one time period and some after another, as by providing additional contactors and relays.

Also, as important to achievement of system diversity factor with respect to time of pickup of system load subsequent to initiation of load shedding, closing time of time control relay 45 would preferably be varied as between customers.

Figure 6:
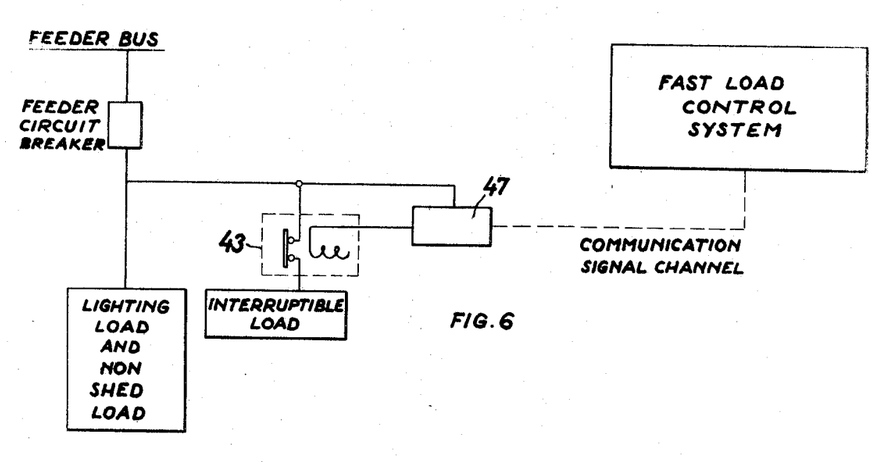
FIG. 6 comprises a modification of the load shedding system.

As an alternate fast load shedding method, which could prove useful, as especially in relation to the shedding of selected portions of industrial loads, selective shedding could be accomplished as per FIG. 6 wherein a remotely controlled, fast opening, time delay reclosing relay 47 controls fast opening contactor 43 in response to signals supplied over a suitable communication channel such, for example, as a telephone circuit.

So far what has been shown relates to load shedding. However, in the event of availability of fast load control means in the form of fast generator prime mover driving power boosting capability and/or capability of either rapidly boosting system 1 input power or reducing output power over D.C. lines, provision to rapidly implement such means either directly in response to power boost signal generator voltage, or in response to an associated stepping switch or other supplementary signal responsive control would be in order, either alone or supplemented by fast load shedding.

Figures 7, 8:
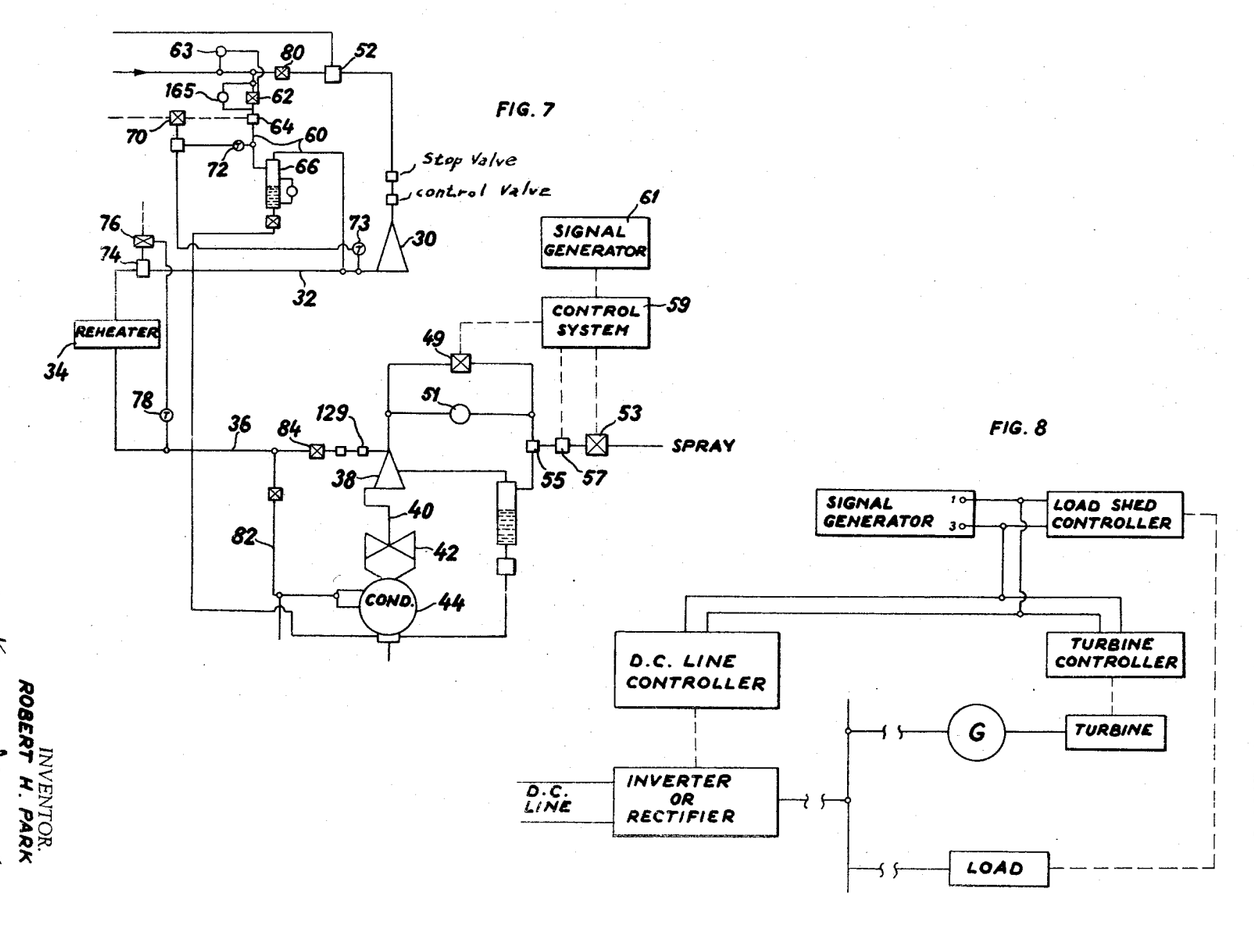
FIG. 7 comprises a reheat type steam turbine and an associated steam generator.
FIG. 8 is a control system diagram.

Evidently, a simple means of accomplishment would be to apply FIG. 2 signal generator output directly to a suitable voltage responsive turbine control such as utilized in equipment described in references (29), (8) and (22), which could include phase advance and/or other antihunting features, or to a suitable voltage responsive D.C. transmission system rectifier or inverter output control unit, as illustrated in FIG. 8.

In this there would be the point that boosting steam turbine output can require ½ to 1 second (29, 8), so that in use of turbine output boosting, supplementary provision for employment of at least momentary load shedding could often be desirable.

In relation to prime mover driving power boosting, in cases where slow driving power response waterwheel driven generators are in operation as say at a remote generating plant, at less than full load, and hence available as system spinning reserve generation, while also one or more base load reheat turbines are in operation, there is the point that with provision for turbine valving downstream of the reheater, the energy stored in the turbine reheater as also with availability of valving to allow high pressure turbine bypassing, also the energy stored in the superheater can be made use of to provide momentary large turbine driving power boost for the period of possibly 4 to 10 seconds that could be required to bring the waterwheel driven generator unit up to full output.

Figure 9:
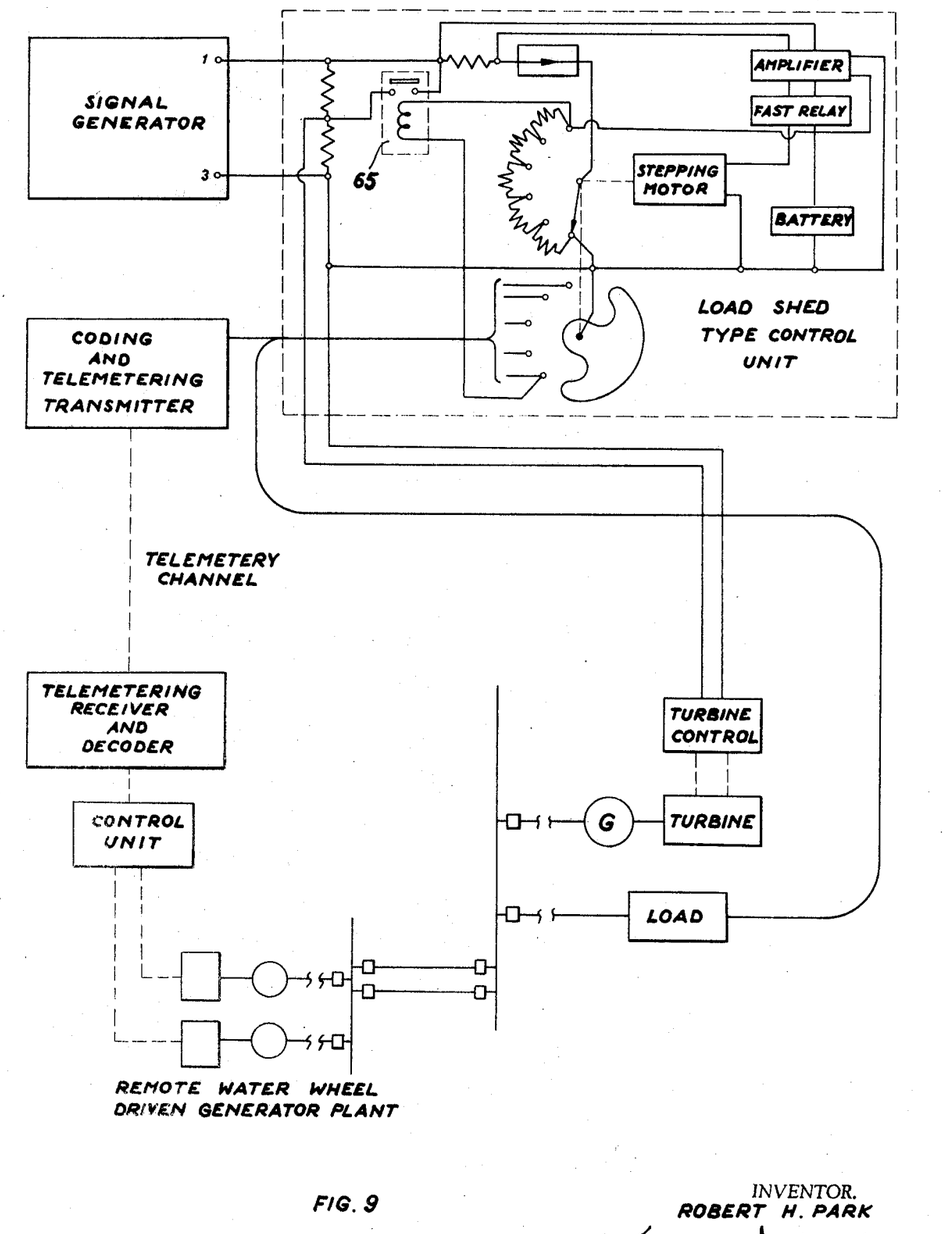
FIG. 9 is a system diagram showing provisions for fast activation of spinning reserve.
Figure 10:
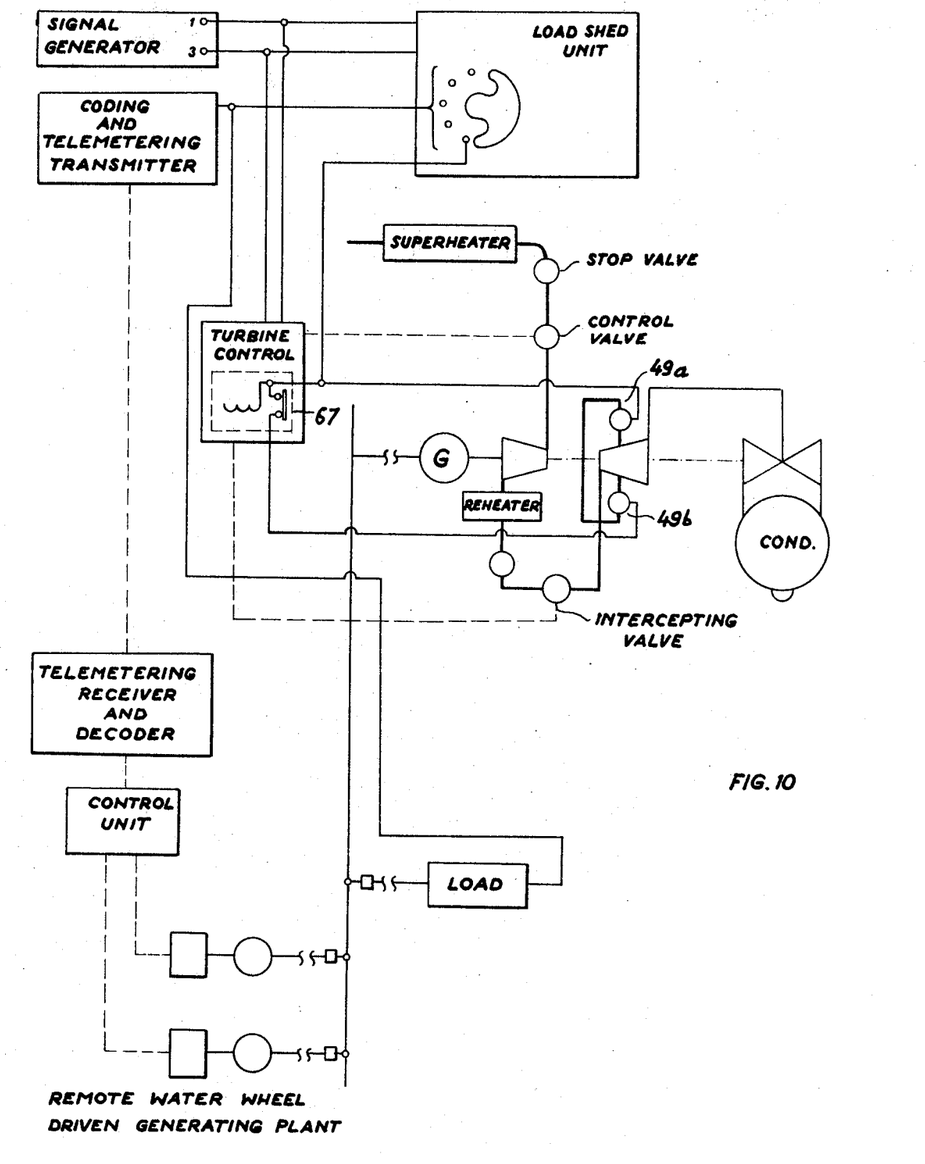
FIG. 10 is a further system diagram showing provisions for fast actuation of spinning reserve.

Here various means of accomplishment would be feasible, as to which two possible systems are shown in FIGS. 9 and 10.

Thus, referring to FIG. 9, the steps of the stepper unit of FIG. 5 could be used to implement a telemetered boost message to a remote waterwheel driven generating plant while the local steam turbine unit could be supplied directly with a driving power boost voltage signal which would be cut back after a time period by fast closing time delay opening relay 65.

Again, a possibly desirable alternate procedure could be that shown in FIG. 10 wherein, on say the first step of the stepper relay, both of dual fast opening valves 49a and 49b open, while after a time delay period controlled by fast closing time delay opening relay 67, valve 49b recloses.

Whereas we have up to now dealt with a condition in which a deficiency of power supply to system 1 develops, it also needs to be recognized that the reverse problem can arise, as when system 1 primarily exports, rather than receives power over any of transmission systems 1–1b, 1–2, 1–3, or 1–4, in which case there can be a need to apply braking load and a reduce system 1 generator prime mover driving power, with a view to preventing loss of synchronism of system 1 with the interconnection.

In this it will be clear that handling of power export conditions can be dealt with by use of precisely the same type of control signal development circuit shown in FIG. 2 except with exclusion of generator power output and transmission system 1–1a circuits, which could have no function since these circuits do not absorb load under normal conditions. Also, transducer connections would have to be reversed, i.e. transducer voltages would represent power outputs from system 1 bus, rather than power inputs. Also it will be evident that FIG. 5 could also be used to momentarily apply braking load, and to program fast reduction of prime mover driving power, with provision to activate not only braking units $BR_1$ and $BR_2$ of FIG. 1 but also, when desirable, units $BR_3$, $BR_4$ and $BR_5$ in response to line carrier or other communication channel signal, while the arrangement of FIG. 8 would apply in relation to prime mover and D.C. line power flow control.

In what has gone before there has been reference to problems of rapidly controlling driving power of steam turbines.

In this connection, momentary steam turbine driving power reduction by fast valving, though limited in speed by steam entrainment effects, is facilitated by the fact that turbines are conventionally designed to close valves rapidly in order to prevent overspeeding on loss of load.

However, the great bulk of power system turbine generators utilize reheat type turbines which, as previously noted, introduces certain problems. Thus, in relation to fast boosting of reheat turbine driving power, delay results in response to opening of the turbine control valves by virtue of the fact that it is necessary to increase reheater pressure before flow to the intermediate and low pressure turbines is influenced, and the further fact that due to the volume of the reheater, the time constant of such changes is typically 5 to 20 seconds.

Accordingly, in the case of turbine-generators of present type, it tends to be true that in starting from an initial stable load condition, with the intercepting valve already wide open, only the high pressure turbine can respond rapidly to a process of fast control valve opening.

Beyond the foregoing, there is the further problem of there being a very substantial economic incentive to run turbines at their best point, which means with control valves all the way open, in order to achieve favorable fuel economy. This, in turn, tends to imply inability to increase driving power.

In this, ways of boosting power which can be applied notwithstanding turbine operation at best point that have been recognized (13, 20, 26) and used, include:

(1) Bypassing feedwater heaters
(2) Increasing spray water ahead of final superheater and reheater
(3) Bypassing the high pressure turbine.

However, these procedures do not avoid delay in response of the intermediate and low pressure turbines incident to time required to fill the reheater.

In relation to boosting reheat turbine driving power the present invention shows how to speed response by providing either a bypass around one or more stages of the intermediate pressure turbine, including the first stage, or a variable area nozzle system ahead of the first stage wheel of the intermediate pressure turbine, in either case with the effect that capability of a rapid boost in driving power of the intermediate and low pressure turbines is achieved.

In relation to boosting driving power it is evident that steam stored in the reheater represents a momentary source of turbine driving power which has the benefit of being immediately available, and which will also tend to be sustained for a period related to the reheater time constant, while with fast response so achieved, boosting on a continued basis will be possible by supplementary employment of measures (1) to (3) as above, as also by control valve action in the case of turbines not operating at full load, and by utilizing measures adapted to increase steam generation, such as providing and bringing into use steam generator for overcapacity and supplementary gas fuel supply, and means to heat feedwater with gas.

To accomplish these results, I employ a steam generator and turbine control system as shown in FIG. 7.

Referring now to FIG. 7, the diagrammatic representation contained therein discloses a steam turbine installation comprising high, intermediate and low pressure turbines with a reheater located between the high and intermediate pressure units, generally as shown in U.S. Pat. 3,055,161 to J. I. Argersinger et al., and wherein common elements are identified in FIG. 7 with like numbers, except with provision to bypass not only the high pressure turbine, but also at least one and preferable several stages of the intermediate pressure turbine, beginning at the first stage, or even to bypass all stages, with employment of valves 49 and 51 in parallel, where valve 49 can represent a quick acting, electrically controlled open or shut type valve, and valve 51 represents a small bleed valve.

Valve 53, which controls application of spray water to desuperheater 55, is in series with water flow control valve 57 which is to be understood supplied with a suitable source of spray water.

Valves 49 and 53 are normally closed, but are adapted to open rapidly when activated by control unit 59 in response to signals received by signal generator unit 61, which could comprise respectively the devices of FIG. 5 and FIG. 2.

With the arrangement as shown, when a turbine driving power boost signal is received, valves 49 and 53 would rapidly open and immediately increase the flow of steam through the intermediate and low pressure turbines by drawing on the stored steam in the reheater.

As this occurs, the reheat pressure would drop, causing an increased amount of power to be developed in the high pressure turbine, thereby in part tending to compensate for reduction in pressure of steam available for driving the intermediate pressure turbine.

The spray system, complete with bypass water separator, is provided to reduce the temperature of the steam entering at the intermediate admission point of the intermediate pressure turbine, with a view to reducing turbine rotor and casing thermal stresses.

Valve 51 is held partly open to constantly bleed steam in order to keep the bypass water separator and the piping hot, while also a similar valve 165 would be provided around valve 62 in each case in order to prevent excessive condensation effects when bypassing is suddenly resorted to.

If determined to be desirable, valve 49 could comprise a fast acting, servo operated, control type valve with electrical controls generally similar to the intercepting valve shown in U.S. Pat. 3,097,488, M. A. Eggenberger et al. (22) and therefore could be controlled directly from signal generator voltage. However, turbine intercepting valve 129 in FIG. 7 would also preferably be of the type in question, thereby allowing controlled rapid reduction in turbine driving power when wanted in response to signal generator voltage, and providing a means of fast modulation of steam flow to the intermediate pressure turbine which would be operative were valve 49 chosen to be of the merely open or shut type.

Again, as a further and possibly preferably means of accomplishing the basic objective of providing a way of rapidly boosting the driving power of reheat type steam turbines, I propose that the nozzles of the first turbine stage following the reheater be made of variable area, using for the purpose a construction generally along lines commonly employed in gas turbines produced by the General Electric Co. (U.S.), and also described in U.S. Pat. 2,651,496, Buckland et al.

As to details of construction, it will be recognized that prevention of leakage of steam at high pressure would presumably make necessary or desirable enclosing the operating mechanism in a pressure tight shell which, however, it is judged, would not represent a difficult technical problem.

Also, in relation to provision of variable area nozzles, it will be clear that considerable simplification would be possible over what is shown in the patent reference in that the nozzles would be applied to the intermediate pressure turbine first stage, while also with provision for modulation of intercepting valve opening, it would be possible to operate the variable nozzle area mechanism as a 2-position system, i.e. a normal position, and a further open flow boost position.

As pertinent to the invention, there is the point that for turbines which use dual reheat, i.e. turbines with reheaters ahead of the second and third units, each of these units could be provided with bypass valving, or alternatively with variable area first stage nozzles.

Evidently it would be possible to also employ fast bypassing of feedwater heaters and boosting of superheater and fast application of reheater sprays as a supplementary means of increasing steam development.

Further, as a relevant aspect of the invention, there is the point that it appears feasible to provide so as to allow boosting of output of steam generators by 20 or more percent for a period of an hour or less by merely going to the relatively small capital expense involved in providing added combustion air fan and fuel supply capacity, which therefore often could be desirable especially when it is borne in mind that under modern extended interconnection conditions, even subsequent to system disturbances, reserve power requirements of other than short duration presumably could usually be arranged via power flow over system ties given a period of say 5 minutes to one half hour to allow rearrangement of intersystem power flows.

In respect to water sprays, there is also the point that where fast flow changes are contemplated, water spray quantity would preferably be correlated directly with steam flow or steam flow valve opening, rather than controlled only in response to temperature as in the Argersinger patent.

Thus in this connection spray control could be related in the first instance and rapidly to steam flow, with added supplementary slow acting temperature control if wanted.

In the matter of practical means of accomplishment of fast load control but which are not deemed to constitute a patentable aspect of the present invention, it may be worthy of note that it is possible to employ certain useful procedures in relation to fast reduction of prime mover driving power.

For example, in fast valve closing of intercepting valves, there has been expression of concern on the part of some engineers as to chance of damage to valve seats if fast closing is too often employed, while further there has been concern as to blowing of high pressure safety valves with fast closing of turbine control valves, in view of the fact that blowing such valves tends to cause leaking, which, in turn, will continue until a complete turbine shutdown period.

However, I propose to avoid these problems by only partially closing the intercepting valve, in response to employment of servo control, or by at first only closing the intercepting valve partially, and thereafter further closing it at reduced speed, whereby to avoid mechanical damage, while also I propose to avoid operation of the high pressure safety valves by providing fast acting and fully commercially available dump valves, which are programmed by the fast turbine control system to dump high pressure steam, either to atmosphere, or, preferably, to the turbine condenser, with concomitant supply of spray water for cooling purposes.

Again, a generally similar bypass to the condenser could always be used to prevent operation of the reheater safety valves, although it is understood that from a practical standpoint advantages derived may be unimportant.

Again, in relation to fast reduction of prime mover driving power, a problem can arise in that speed of intercepting valve opening is commonly somewhat restricted with a view to minimizing possible turbine overspeed hazards.

Where only a brief reduction of driving power is wanted, a problem could arise if the intercepting valve were fully or nearly closed, in that in some cases delay in reopening would offer disadvantages. However, this problem can also be reduced in scope by the procedure of providing so as to only partially close the intercepting valve in response to suitable servo system control.

Also, it will be clear that where a sudden, sustained drop in driving power of a reheat type turbine is wanted, it will be only feasible to achieve desired results by using the intercepting valve as a steam flow modulation device to supplement control valve modulation of steam flow to the high pressure turbine which, however, it is judged can be accomplished by those skilled in the art merely with application of generally known practices (21, 22).

Throughout, in what has gone before, numbers in parentheses in the text have been supplied in reference to the table of references below, which has been made use of as a convenient means of presentation of pertinent technical information already known in the art.

(1) "System Stability as a Design Problem," R. H. Park and E. H. Bancker, Trans. AIEE January 1929, vol. 48, p. 170 et seq.

(2) "Governor Performance During System Disturbances," R. C. Buell, R. J. Caughey, E. M. Hunter, and V. M. Marquis, Trans AIEE March 1931, vol. 50, p. 354 et seq.

(3) U.S. Pat. 1,834,807, "System of Electrical Distribution," W. Skeats, Dec. 1, 1931.

(4) U.S. Pat. 1,935,292, "Regulator System," S. B. Griscom and C. W. Wagner, Nov. 14, 1933.

(5) U.S. Pat. 2,285,203, "Control Equipment," F. A. Hamilton, Jr., June 2, 1942.

(6) "Report of the International Study Committee No. 13: System Stability and Voltage Load Frequency Control," Bo G. Rathsman, CIGRE Report 336, 1952, p. 6.

(7) U.S. Pat. 2,651,496, David Buckland et al., Sept. 8, 1953.

(8) "Controls for Operation of Steam Turbine-Generator Units," O. N. Bryant, C. C. Sterrett, D. M. Sauter, Trans AIEE February 1954, vol. 73–IIIa, p. 79 et seq.

(9) "Load Reduction by Underfrequency Relays During System Emergencies," W. C. Gierisch, Trans AIEE February 1955, vol. 73 III–B, p. 1651 et seq.

(10) "Application and Test of Frequency Relays for Load Shedding," L. L. Fountain and J. L. Blackburn, ibid., p. 1660 et seq.

(11) "Automatic Load Shedding," AIEE Committee Report, Trans AIEE December 1955, vol. 74, p. 1143 et seq.

(12) "Increasing the Reliability of Operation of Power Systems and Long Distance Transmission Lines," D. I. Azaryev, L. G. Mamikonyants, I. A. Syromyatnikov, and A. A. Venikov, CIGRE Report No. 318, 1958.

(13) "Large Steam Turbine Generators With Spinning Reserve Capacity," J. E. Downs and E. H. Miller, 1960 American Power Conference.

(14) "The Use of Repeated Electrical Braking and Unloading To Improve the Stability of Power Systems," V. M. Gornshtein and Ya. N. Luginskii, Electric Technology U.S.S.R., vol. 2, 1962, p. 292.

(15) U.S. patent application Ser. No. 219,711, "Means for Maintaining Stability of Power Transmission Systems Notwithstanding a Fault," R. H. Park, filed Aug. 27, 1962.

(16) U.S. Pat. 3,051,842, "Means for Maintaining Stability of Power Transmission Systems During a Fault," R. H. Park, Aug. 28, 1962.

(17) U.S. Pat. 3,055,181, "Method of Operating a Power Plant System," J. I. Argersinger et al., Sept. 25, 1962.

(18) "The Stability of a Hydro-Electric Generator With Electric Braking," D. Ye. Trofimenko, Electric Technology U.S.S.R., vol. 1, 1962, p. 70.

(19) "The Art and Science of Protective Relaying," C. Russell Mason, John Wiley & Sons, Inc., New York, 1962.

(20) "Advisory Committee Report No. 1 on Methods of Carrying Peak Loads and Methods of Reducing Peak Loads," Federal Power Commission, January 1963.

(21) U.S. Pat. 3,097,490, "Electro-Hydraulic Control System for Turbine With Pressure Feedback," P. C. Callan et al., July 16, 1963.

(22) U.S. Pat. 3,097,488, "Turbine Control System," M. A. Eggenberger et al., July 16, 1963.

(23) "A Selective Load Shedding System," G. D. Rockefeller, Westinghouse Engineer, November 1963.

(24) "Coordinated Regional E.H.V. Planning in the Middle Atlantic States, U.S.A.," J. A. Casazza, R. W. Werts, W. B. Fisk, E. S. Van Nostrand, CIGRE Report No. 315, 1964.

(25) "Parallel Operation of A-C and D-C Power Transmission," Peterson, Reitan and Phadke, 1964 IEEE International Convention Record, p. 84 et seq. See also Trans. IEEE–PAS 1965, pp. 15–19.

(26) "National Power Survey—Federal Power Commission—1964," part 1, pp. 125–127, U.S. Government Printing Office.

(27) "A Power Swing Relay for Predicting Generation Instability," R. D. Brown and K. R. McClymont, IEEE No. 65–90, Winter Power Meeting 1965.

(28) "Boiler-Turbine Coordination During Startup and Loading of Large Units," F. J. Hanzalek and P. G. Ipsen, ASME No. 65–WA/PWR–9, December 1965.

(29) "25/41 MW Cyclic Steam Power Plant Serves Hot Strip Steel Finishing Mill," D. V. Fawcett, IEEE No. 65–36, Winter Power Meeting, 1965.

(30) "Dynamic Stability of the Peace River Transmission System," H. M. Ellis, A. L. Blythe, J. E. Hardy, and J. W. Skooglund, IEEE No. 65–813, October 1965.

(31) "The Automatic Control of Electric Power in the United States," Nathan Cohn, IEEE Spectrum, November 1965.

(32) "Fringe Generation Damps Tie-Line Oscillations," Electrical World, Jan. 10, 1966, p. 48 et seq.

(33) "A Modern View of Out of Step Relaying," G. D. Rockefeller and W. A. Elmore, IEEE No. 66–34, Winter Power Meeting, 1966.

(34) "Five Years' Experience on the Consolidated Edison System With Protection of Turbine Generators and Boilers by Automatic Tripping," W. C. Beattie, H. A.

Bauman, J. M. Driscoll, T. J. Onderdonk, R. L. Webb, Trans. AIEE February 1959, vol. 77–III (and discussion), pp. 1353–1366.

(35) "Protection of Large Steam Turbine Generator Units on TVA System," M. S. Merritt, J. A. Ackerman, R. C. Price, and L. E. Owen, IEEE "Power Apparatus and Systems," April 1965.

(36) "The Story of Bonneville Power," Friedlander, Spectrum, December 1968, p. 72.

(37) Letter to the Editor, Peter Kubilius, "Electrical World," Nov. 29, 1965, p. 5.

While the present invention has been described in conjunction with preferred embodiments, it is to be understood that modifications and variations may be resorted to without departing from the spirit and scope of the invention, as those skilled in the art will readily understand.

Thus, for example, persons skilled in the art can readily devise a digital type signal and memory unit for use in place of the analog types illustrated in FIGS. 2 and 5.

Also, an aspect of a digital signal generator would be that values of $P_{sb}$, or in the event of an excess of power supply in system 1, a quantity which could be designated $P_{br}$, where $$P_{br} = L_b + P_r$$

where:

$L_b$ = electrical braking load
$P_r$ = a measure of benefit equivalent to application of braking load that can be derived from reduction of system 1 prime mover driving power plus effects due to fast regulation of power supply over D.C. lines, if any could be arrived at in relation to type of power interruption and transmission system load conditions by reference to suitable digitally stored data which could have been arrived at by suitable advance system studies.

Modifications and variations such as the foregoing are considered to be within the purview and scope of the invention and the appended claims.

What I claim as new and desire to secure by Letters Patent of the United States is:

1. In a power system having generators and loads disposed upon the premises of a customer and including a combination of interruptible and noninterruptible loads, load shedding apparatus comprising means for effecting interruption of flow of power from said system to said interruptible loads in response to momentary interruption of power flow from said system to said combination of loads, and means for automatically reconnecting said interruptible loads after a time delay period determined by a timing device.

2. In an extended power system interconnection incorporating power generating and power receiving elements, a transmission system comprising at least two lines which act in parallel to electrically unite system power generating and power receiving elements one of said lines being a D.C. line, a device for reducing the power flow over said D.C. line in response to the occurrence of certain events, control means for said device adapted for inducing power flow reducing operation of said device, means for activating said control means, fast prime mover driving power and system connected electrical load control means for favorably affecting the stability of the interconnection notwithstanding the reduction of power flow over said D.C. line, and means responsive to the event leading to power flow reduction for initiating action of said fast prime mover driving power and system connected electrical load control means substantially coincidentally with the occurrence of said reduction.

References Cited
UNITED STATES PATENTS

| | | | |
|---|---|---|---|
| 3,124,699 | 3/1964 | Kirchmayer | 307—57 |
| 3,229,110 | 1/1966 | Kleinbach et al. | 307—57 |
| 3,271,580 | 9/1966 | Pope | 307—29 |
| 3,300,648 | 1/1967 | Rockefeller et al. | 307—86 X |

ROBERT S. MACON, Primary Examiner

H. J. HOHAUSER, Assistant Examiner

U.S. Cl. X.R.
317—19